United States Patent
Ma et al.

(10) Patent No.: US 12,174,956 B2
(45) Date of Patent: Dec. 24, 2024

(54) PATTERN SIMILARITY MEASURES TO QUANTIFY UNCERTAINTY IN MALWARE CLASSIFICATION

(71) Applicant: Zscaler, Inc., San Jose, CA (US)

(72) Inventors: Changsha Ma, Palo Alto, CA (US); Dianhuan Lin, Sunnyvale, CA (US); Rex Shang, Los Altos, CA (US); Kevin Guo, Milpitas, CA (US); Howie Xu, Palo Alto, CA (US)

(73) Assignee: Zscaler, Inc., San Jose, CA (US)

( * ) Notice: Subject to any disclaimer, the term of this patent is extended or adjusted under 35 U.S.C. 154(b) by 654 days.

(21) Appl. No.: 16/542,385

(22) Filed: Aug. 16, 2019

(65) Prior Publication Data
US 2021/0049413 A1  Feb. 18, 2021

(51) Int. Cl.
  *G06F 21/56*   (2013.01)
  *G06F 18/214*  (2023.01)
(52) U.S. Cl.
  CPC ........ *G06F 21/561* (2013.01); *G06F 18/2148* (2023.01); *G06F 21/565* (2013.01); *G06F 21/566* (2013.01)
(58) Field of Classification Search
  CPC .. G06K 9/6257; G06K 9/6247; G06K 9/6284; G06K 9/6215; G06F 21/561; G06F 21/565; G06F 21/566; G06F 21/53; G06F 21/56
  See application file for complete search history.

(56) References Cited

U.S. PATENT DOCUMENTS

| | | | |
|---|---|---|---|
| 9,152,789 B2 | 10/2015 | Natarajan et al. | |
| 11,075,930 B1* | 7/2021 | Xavier | H04L 63/1425 |
| 11,227,047 B1* | 1/2022 | Vashisht | G06F 21/56 |
| 11,227,048 B2* | 1/2022 | Chistyakov | G06F 21/566 |
| 11,392,855 B1* | 7/2022 | Murakonda | G06N 5/01 |
| 2006/0026675 A1* | 2/2006 | Cai | G06F 21/562 726/22 |
| 2009/0099988 A1* | 4/2009 | Stokes | G06F 15/16 706/20 |
| 2013/0198119 A1* | 8/2013 | Eberhardt, III | G06N 20/00 706/12 |

(Continued)

OTHER PUBLICATIONS

Jordaney, Roberto, et al. "Transcend: Detecting concept drift in malware classification models." 26th {USENIX} Security Symposium ({USENIX} Security 17). 2017.

(Continued)

*Primary Examiner* — Maung T Lwin
*Assistant Examiner* — Suman Debnath
(74) *Attorney, Agent, or Firm* — Baratta Law PLLC; Lawrence A. Baratta, Jr.; Ryan Odessa

(57) ABSTRACT

Systems and methods include receiving content for classification; classifying the content as one of benign and malicious utilizing a model that has been trained with a training set of data including benign data and malicious data; determining a first pattern associated with the content; comparing the first pattern with a second pattern that is associated with one of the benign data and the malicious data; and determining an uncertainty of the classifying based on a distance between the first pattern and the second pattern. The systems and methods can include discarding the classification if the distance is greater than a configurable threshold.

16 Claims, 11 Drawing Sheets

(56) References Cited

U.S. PATENT DOCUMENTS

| | | | | |
|---|---|---|---|---|
| 2014/0237597 | A1* | 8/2014 | Zhang | G06F 21/60 |
| | | | | 726/23 |
| 2018/0234443 | A1* | 8/2018 | Wolkov | H04L 67/535 |
| 2018/0293381 | A1* | 10/2018 | Tseng | G06N 20/20 |
| 2019/0286757 | A1* | 9/2019 | Muntés-Mulero | G06K 9/6215 |
| 2019/0295000 | A1* | 9/2019 | Candel | G06N 3/126 |
| 2020/0213325 | A1* | 7/2020 | Scherman | H04L 63/104 |

OTHER PUBLICATIONS

Kantchelian, Alex, J. D. Tygar, and Anthony Joseph. "Evasion and hardening of tree ensemble classifiers." International Conference on Machine Learning. 2016.

Tolomei, Gabriele, et al. "Interpretable predictions of tree-based ensembles via actionable feature tweaking." Proceedings of the 23rd ACM SIGKDD International Conference on Knowledge Discovery and Data Mining. ACM, 2017.

* cited by examiner

PATTERN SIMILARITY MEASURES TO QUANTIFY UNCERTAINTY IN MALWARE CLASSIFICATION

FIELD OF THE DISCLOSURE

The present disclosure relates generally to Machine Learning (ML) systems and methods for use in network and computer security. More particularly, the present disclosure relates to systems and methods for pattern similarity measures to quantify uncertainty in malware classification.

BACKGROUND OF THE DISCLOSURE

Machine learning techniques are proliferating and offer many use cases. In network security, use cases for machine learning include malware detection, identifying malicious files for further processing such as in a sandbox, user or content risk determination, intrusion detection, etc. The general process includes training where a machine learning model is trained on a dataset, e.g., data including malicious and benign content or files, and, once trained, the machine learning model is used in production to classify unknown content based on the training. Of course, machine learning precision is critical, and the focus of research. As a machine learning model is only as good as the training data/samples, there is always an aspect of uncertainty with respect to a prediction (i.e., a classification) for unknown content. For example, new malware content may be unlike any previous sample in the training set and may appear benign and be classified as such. There is a need to quantify this uncertainty and to use this quantity for various improvements, such as correcting misclassification results, detecting concept drift, better selecting training samples, etc.

BRIEF SUMMARY OF THE DISCLOSURE

In an embodiment, a non-transitory computer-readable storage medium has computer-readable code stored thereon for programming one or more processors to perform steps of receiving content for classification; classifying the content as one of benign and malicious utilizing a model that has been trained with a training set of data including benign data and malicious data; determining a first pattern associated with the content; comparing the first pattern with a second pattern that is associated with one of the benign data and the malicious data; and determining an uncertainty of the classifying based on a distance between the first pattern and the second pattern. The computer-readable code can be further configured to program the one or more processors to perform steps of discarding the classification if the distance is greater than a configurable threshold. The computer-readable code can be further configured to program the one or more processors to perform steps of determining the model has drifted based on the distance and one or more previous distances from previously classified content; and causing retraining of the model with a new training set of data, including benign data and malicious data. The computer-readable code can be further configured to program the one or more processors to perform steps of one of i) blocking the content if the content is malicious and the distance is less than a first threshold and ii) allowing the content if the content is benign and the distances is less than a second threshold. The distance can represent a similarity between the content and one of the benign data and the malicious data. The first pattern and the second pattern can be determined utilizing one of Principal Component Analysis (PCA) and Auto-encoder. The first pattern and the second pattern can be determined based on a plurality of features. The distance can be determined as a reconstruction error mapping a pattern to its original feature space. The content can be one of an executable file, an office file, and a Portable Document File (PDF).

In another embodiment, a system includes a network interface; a processor communicatively coupled to the network interface; and memory storing computer-executable instructions that, when executed, cause the processor to receive content for classification, classify the content as one of benign and malicious utilizing a model that has been trained with a training set of data including benign data and malicious data; determine a first pattern associated with the content; compare the first pattern with a second pattern that is associated with one of the benign data and the malicious data; and determine an uncertainty of the classification based on a distance between the first pattern and the second pattern. The computer-executable instructions, when executed, can further cause the processor to discard the classification if the distance is greater than a configurable threshold. The computer-executable instructions, when executed, can further cause the processor to determine the model has drifted based on the distance and one or more previous distances from previously classified content; and cause retraining of the model with a new training set of data, including benign data and malicious data. The computer-executable instructions, when executed, can further cause the processor to one of i) block the content if the content is malicious and the distance is less than a first threshold and ii) allow the content if the content is benign and the distances is less than a second threshold. The distance can represent a similarity between the content and one of the benign data and the malicious data. The first pattern and the second pattern can be determined utilizing one of Principal Component Analysis (PCA) and Auto-encoder. The first pattern and the second pattern can be determined based on a plurality of features. The content can be one of an executable file, an office file, and a Portable Document File (PDF).

In a further embodiment, a method includes receiving content for classification; classifying the content as one of benign and malicious utilizing a model that has been trained with a training set of data including benign data and malicious data; determining a first pattern associated with the content; comparing the first pattern with a second pattern that is associated with one of the benign data and the malicious data; and determining an uncertainty of the classifying based on a distance between the first pattern and the second pattern. The method can further include discarding the classification if the distance is greater than a configurable threshold. The method can further include determining the model has drifted based on the distance and one or more previous distances from previously classified content; and causing retraining of the model with a new training set of data including benign data and malicious data.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

DETAILED DESCRIPTION OF THE DISCLOSURE

Figure 1:
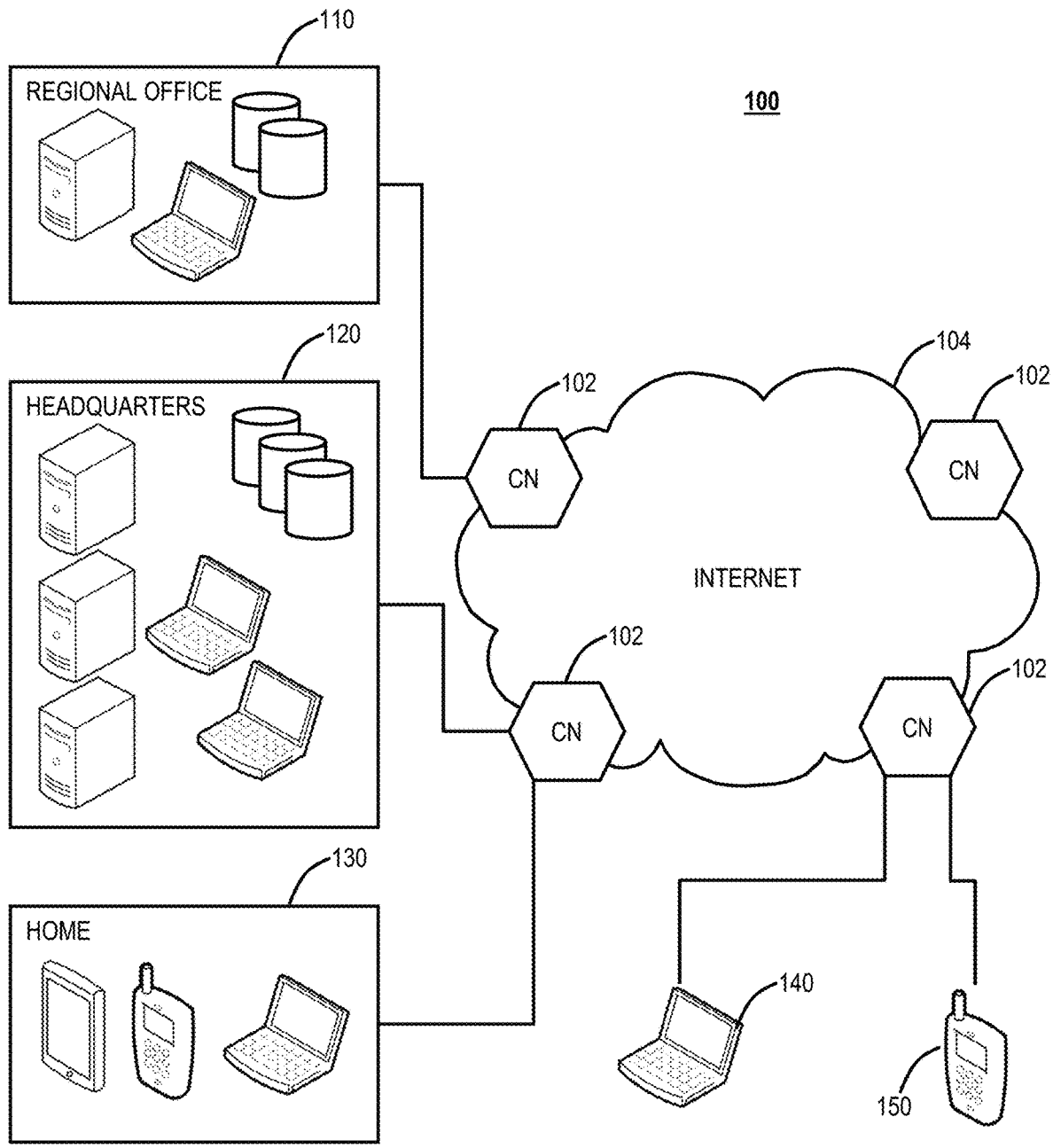
FIG. 1 is a network diagram of a cloud-based system for implementing various cloud-based services.

The present disclosure relates to systems and methods for pattern similarity measures to quantify uncertainty in malware classification. The present disclosure proposes a pattern similarly analysis that provides an objective measure of uncertainty related to a model classification of content. Specifically, unknown content is analyzed and classified by a model that has been trained based on a set of training data. The result of the classification can be either malicious or benign. In addition to this result, the pattern similarity analysis detects patterns in the unknown content and in the training data for the model. With these two patterns, it is possible to determine a distance between them using various distance functions. This distance can be used as a measure of uncertainty for the classification result. That is, content classified as malicious, but the pattern distance is large is indicative of uncertainty in the classification result. Thus, the pattern similarity analysis is a separate analysis from the model classification that can be used as a check for the uncertainty of the model classification result. Advantageously, the pattern similarity analysis can be used with any classification model or optimization technique. That is, the pattern similarity analysis is agnostic to the classification technique. Further, while the present disclosure describes this pattern similarity analysis with respect to malware detection, it can be applied to any machine learning model use case including those outside of malware detection.

With an objective measure of model classification uncertainty, the present disclosure enables the correction of misclassification results for better efficacy. This can be used to both improve precision and recall. Also, the objective measure can be used to detect so-called concept drift to trigger retraining of the machine learning model. Here, the objective measure is used to detect the model has lost its accuracy and should be retrained. Further, the objective measure can be used to enhance data selection for the training phase.

The present disclosure contemplates use in network security, including inline security systems in the cloud which monitor data between the Internet, enterprises, and users. In such systems, latency is critical, and higher precision machine learning models are necessary as false predictions must be avoided. That is, a security system cannot tolerate a false positive (i.e., a content item that is deemed undesirable or malware, but is actually benign) in malware detections, since a false positive will reduce end users' routine efficiency and then decrease their trust of the system. A security cannot tolerate a false negative (i.e., a content item that is deemed benign, but is actually malicious) in non-malware prefiltering, since a false negative will cause damage on the end user side. Accordingly, machine learning classification precision is key. High precision is required due to the high cost of false predictions. In an embodiment, the present disclosure can be used to increase the precision of determining whether or not to sandbox (quarantine) a content item for further analysis in an inline security system. Other embodiments and use cases including areas outside of network security are also contemplated.

Example Cloud System Architecture

Figure 2:
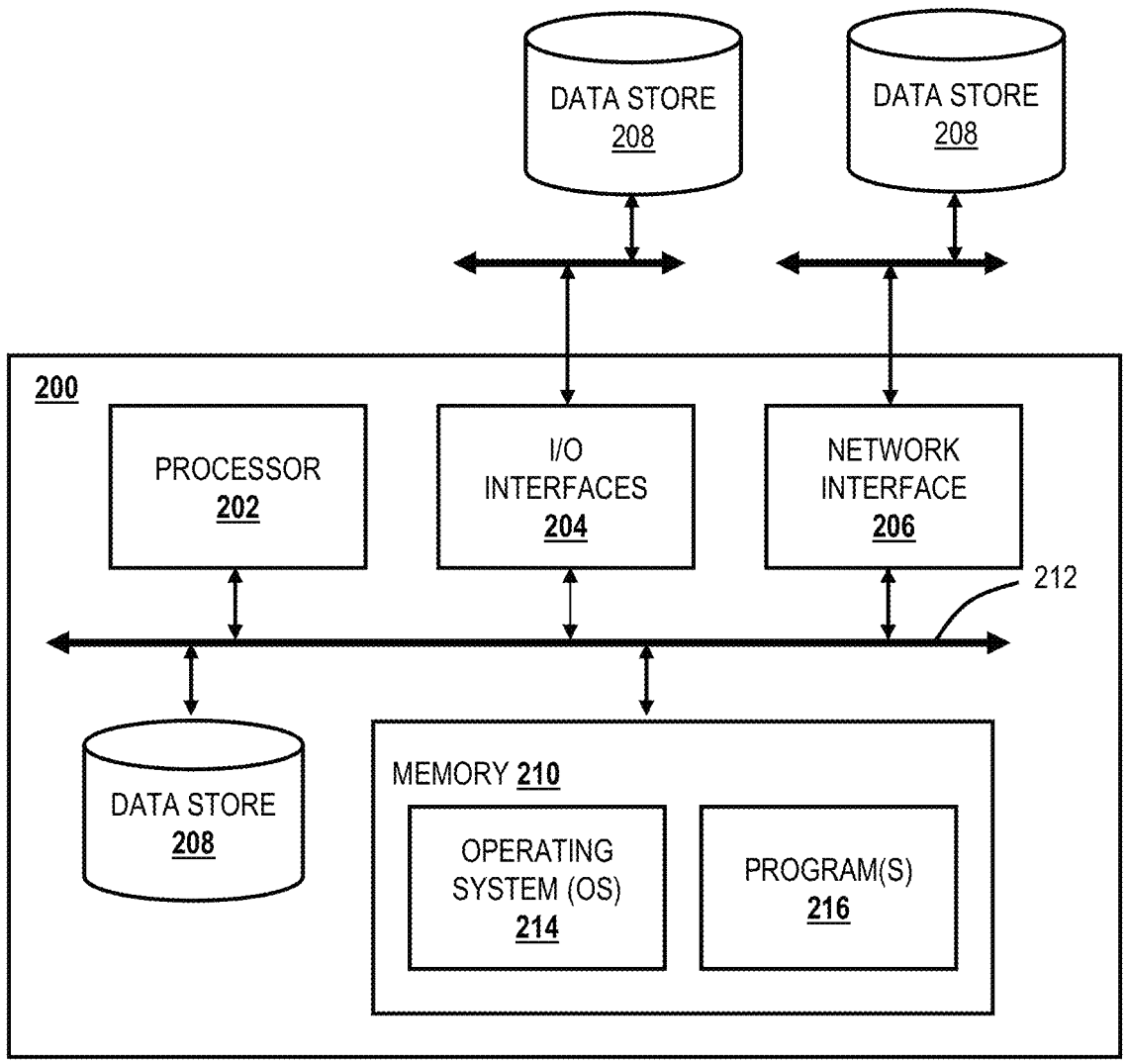

FIG. 1 is a network diagram of a cloud-based system 100 for implementing various cloud-based services. The cloud-based system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130 with associated devices, laptops/desktops 140, and mobile devices 150 each of which can be communicatively coupled to one of the cloud nodes 102. These locations 110, 120, 130 and devices 140, 150 are shown for illustrative purposes, and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end-users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee/applicant of the present application). The IA service can include firewall, threat prevention, Deep Packet Inspection (DPI), Data Leakage Prevention (DLP), and the like. The PA can include access control, microservice segmentation, etc. For example, the IA service can provide a user with secure Internet Access, and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as malware detection, spam filtering, Uniform Resource Locator (URL) filtering, antivirus protection, bandwidth control, DLP, zero-day vulnerability protection, policy enforcement, web 2.0 features, and the like. In an embodiment, the cloud-based system 100 may be viewed as Security-as-a-Service through the cloud, such as the IA.

In an embodiment, the cloud-based system 100 can be configured to provide security and policy systems and methods. The mobile device 150 may include common devices such as laptops, smartphones, tablets, netbooks, personal digital assistants, MP3 players, cell phones, e-book readers, and the like. The cloud-based system 100 is configured to provide inline security and policy enforcement for devices in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users which is dynamically available at the cloud nodes 102, etc.

When providing inline security, the cloud-based system 100 is required to minimize latency for user experience while avoiding incorrect classifications. For example, a cloud node 102 is located between a user device and the Internet 104 and/or an enterprise network. The cloud node 102 can perform processing on content items exchanged therebetween. As described herein, a content item can include a packet, a file (any type), an email, a streaming session, a resource such as defined by a Uniform Resource Locator (URL), etc. The cloud node 102 can include various data inspection engines that are configured to perform a threat classification on a content item, e.g., clean, spyware, malware, undesirable content, innocuous, spam email, unknown, etc. In an embodiment, the threat classification may be reduced to a subset of categories, e.g., violating, non-violating, neutral, unknown. The threat classification can be utilized to determine appropriate actions such as allow, block, warn, perform further processing, etc.

Example Server Architecture

FIG. 2 is a block diagram of a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Machine Learning in Network Security

In the context of the cloud-based system 100 as an inline security system, machine learning can be used in various applications including malware detection, intrusion detection, threat classification, the user or content risk, detecting malicious clients or bots, etc. In a particular use case, machine learning can be used on a content item, e.g., a file, to determine if further processing is required during inline processing. For example, machine learning can be used in conjunction with a sandbox to identify malicious files. A sandbox as the name implies is a safe environment where a file can be executed, opened, etc. for test purposes to determine whether the file is malicious or benign. It can take a sandbox around 10 minutes before it is fully determined whether the file is malicious or benign. Of course, inline monitoring is just one possible use case, and the present disclosure contemplates other embodiments.

Machine learning can determine a verdict in advance before a file is sent to the sandbox. If a file is predicted as benign, it does not need to be sent to the sandbox. Otherwise, it is sent to the sandbox for further analysis/processing. Advantageously, utilizing machine learning to pre-filter a file significantly improves user experience by reducing the overall quarantine time as well as reducing workload in the sandbox. Further, it follows that the machine learning predictions require high precision due to the impact of a false prediction, i.e., finding a malicious file to be benign. Machine learning can compensate a sandbox result to provide better zero-day malware detection.

In the context of inline processing, sandboxing does a great job in detecting malicious files, but there is a cost in latency, which affects user experience. Machine learning can alleviate this issue by giving an earlier verdict on the static files. However, it requires ML to have extremely high precision, since the cost of a false positive and false negative are very high. For example, a benign hospital life-threatening file if mistakenly blocked due to an ML model's wrong verdict would cause life disaster. Similarly, undetected ransomware could cause problems for an enterprise. Therefore, there is a need for a high-precision approach for both benign and malicious files.

The conventional approach to improve precision includes improving the probability threshold to increase precision. A p-value (probability value) is a statistical assessment for measuring the reliability of a prediction, but this does not identify the unreliability of predictions with high probabilities.

A description utilizing machine learning in the context of malware detection is described in commonly-assigned U.S. patent application Ser. No. 15/946,706, filed Apr. 5, 2018, and entitled "System and method for malware detection on a per packet basis," the content of which is incorporated herein by reference. As described here, the typical machine learning training process collects millions of malware samples, extracts a set of features from these samples, and feeds the features into a machine learning model to determine patterns in the data. The output of this training process is a machine learning model that can predict whether a file that has not been seen before is malicious or not.

Another example of improving machine learning precision is described in commonly-assigned U.S. patent application Ser. No. 16/377,129, filed Apr. 5, 2019, and entitled "Prudent ensemble models in machine learning with high precision for use in network security," the content of which is incorporated herein by reference. This disclosure focuses on identifying blind spots in a model and discarding classification results landing in the blind spots.

The present disclosure presents an additional analysis referred to herein as a pattern similarity analysis which quantifies the uncertainty in a model classification.

Pattern Similarity Analysis

Figure 3:
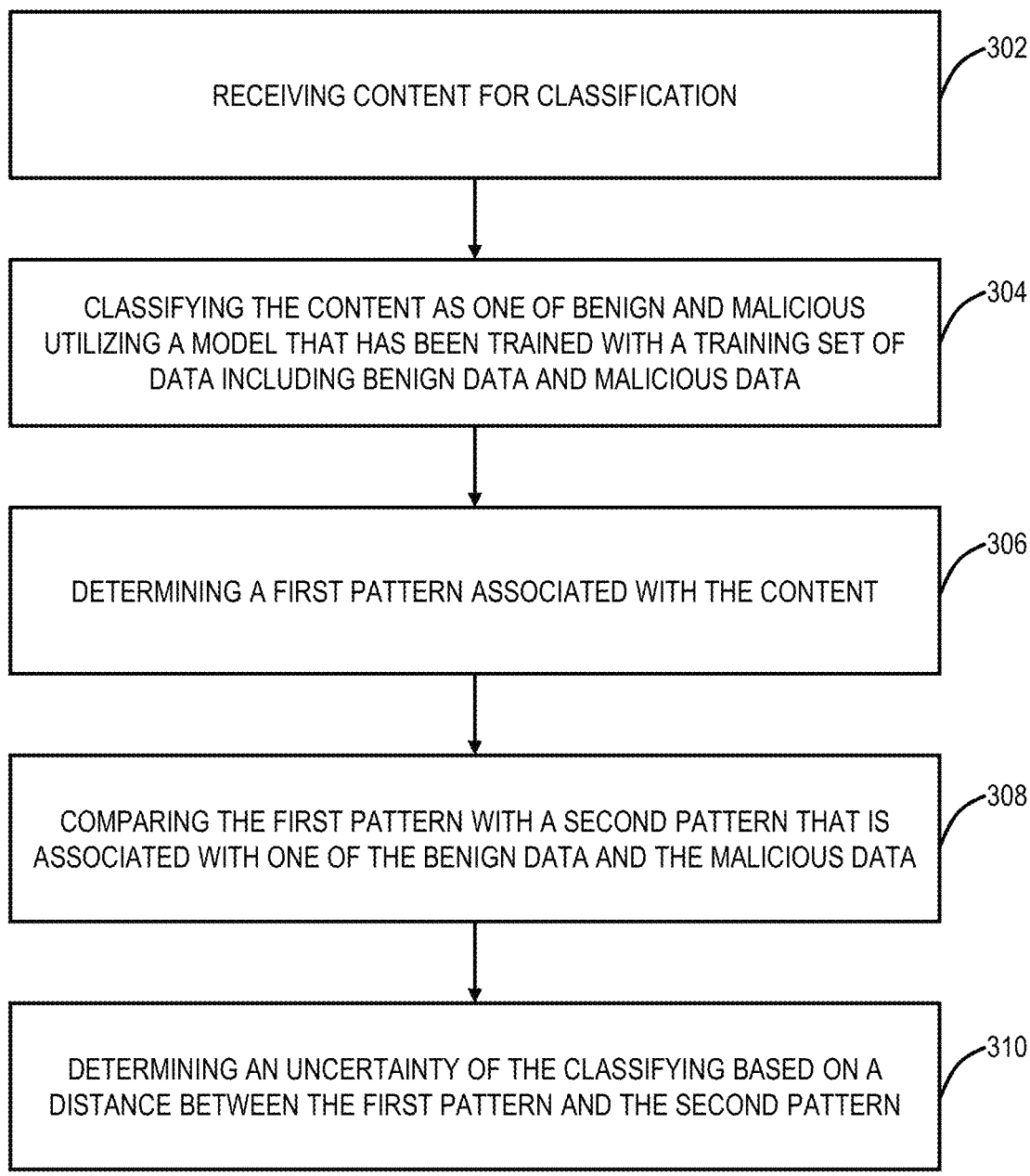
FIG. 3 is a flowchart of a pattern similarity analysis process.

FIG. 3 is a flowchart of a pattern similarity analysis process 300. The pattern similarity analysis process 300 can be realized as a computer-implemented method, a non-transitory computer-readable storage medium having computer-readable code stored thereon for programming one or more processors to perform steps, and via the server 200 or another type of processing apparatus.

The pattern similarity analysis process 300 includes receiving content for classification (step 302); classifying the content as one of benign and malicious utilizing a model that has been trained with a training set of data including benign data and malicious data (step 304); determining a first pattern associated with the content (step 306); comparing the first pattern with a second pattern that is associated with one of the benign data and the malicious data (step 308); and determining an uncertainty of the classifying based on a distance between the first pattern and the second pattern (step 310).

The pattern similarity analysis process 300 can include discarding the classification if the distance is greater than a configurable threshold. The pattern similarity analysis process 300 can include determining the model has drifted based on the distance and one or more previous distances from previously classified content; and causing retraining of the model with a new training set of data including benign data and malicious data. The pattern similarity analysis process 300 can include one of i) blocking the content if the content is malicious and the distance is less than a first threshold and ii) allowing the content if the content is benign and the distances are less than a second threshold.

The distance represents a similarity between the content and one of the benign data and the malicious data. The first pattern and the second pattern can be determined utilizing one of Principal Component Analysis (PCA) and Auto-encoder. The first pattern and the second pattern are determined based on a plurality of features. The content can be one of an executable file, an office document (e.g., Microsoft), and a Portable Document File (PDF).

Pattern Similarity Measure Flow

Figure 4:
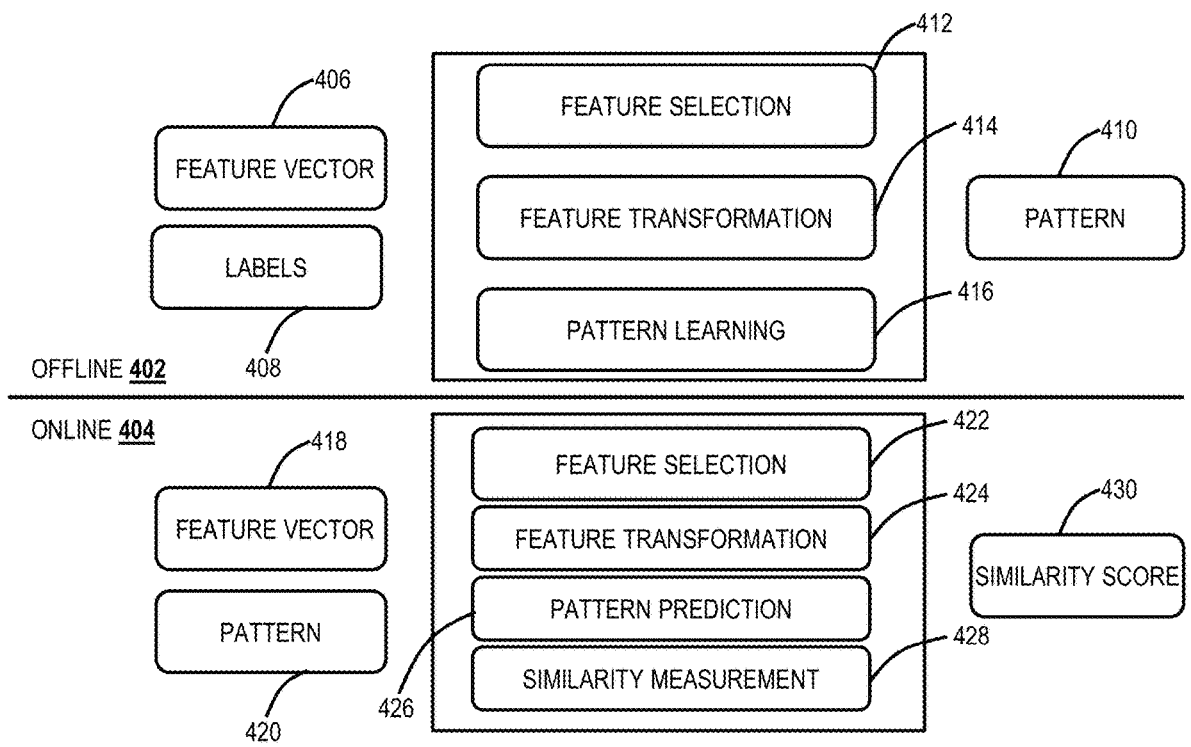
FIG. 4 is a diagram of pattern similarity measure flow.

FIG. 4 is a diagram of pattern similarity measure flow 400. The pattern similarity measure flow 400 includes an offline portion 402 and an online portion 404. The offline portion 402 is part of training a model. For example, a model is trained based on a feature vector 406 and labels 408 for a training data set. The training data set can include benign data and malicious data with different features. In addition to training the model with the training data set, the pattern similarity measure flow 400 includes determining a pattern 410 associated with each of the benign data and the malicious data.

The pattern 410 is determined by selecting features 412, transforming the features 414, and learning the corresponding pattern 416. At this point, there is a trained model that can categorize unknown content as one of benign or malicious based on the training data set. Further, the pattern 410 is determined, which represents the features of the training data set. Note, the pattern 410 includes one pattern for the benign data set and one pattern for the malicious data set.

The online portion 404 is performed after the offline portion 402. Here, uncategorized content is categorized via the model. The uncategorized content can also include a feature vector 418, which can provide a pattern 420 for the uncategorized content. The online portion 404 can include feature selection 422 for the uncategorized content, feature transformation 424, a pattern prediction 426, and a similarly measurement 428 between the pattern 420 of the uncategorized content and the pattern 410, to provide a similarity score 430. For example, if the model classifies the uncategorized content as benign, the flow 400 would compare the pattern 420 of the uncategorized content with the pattern 410 of the benign data set and the similarity score 430 can be used to determine how certain/uncertain the classification is.

Figure 5:
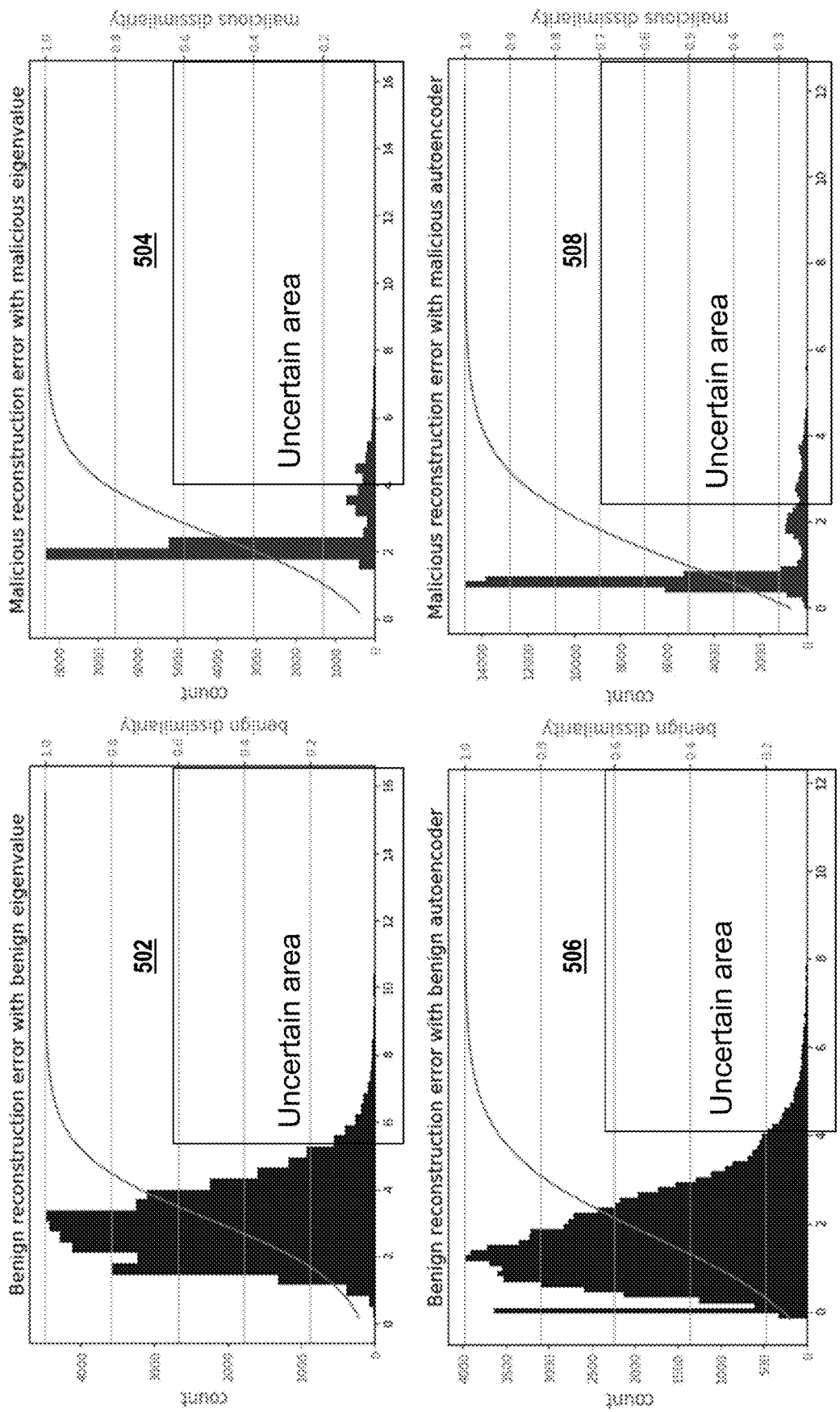
FIG. 5 is four graphs illustrating reconstruction error for benign and malicious data, for PCA and auto-encoder pattern recognition techniques.

FIG. 5 is four graphs 502, 504, 506, 508 illustrating reconstruction error for benign and malicious data, for PCA and auto-encoder pattern recognition techniques. The graphs 502, 504 are for the PCA illustrating eigenvalues for data, and the graphs 506, 508 are for the auto-encode illustrating values for data. Specifically, the data values in all of the graphs 502, 504, 506, 508 are the similarity scores 430. A higher dissimilarity corresponds to higher uncertainty, noted as an "uncertain area" in each of the graphs 502, 504, 506, 508. Again, this value is used in addition to the model classification output to make a prediction.

Features used to determine a pattern may include raw byte ngram count and frequency, word frequency, entropy, file size, and so on. Similarity measures may be a cosine similarity between an original feature vector and a feature vector mapped from a pattern to its original space.

PCA is the general name for a technique which uses sophisticated underlying mathematical principles to transform a number of possibly correlated variables into a smaller number of variables called principal components. PCA is a technique for feature extraction—so it combines input variables in a specific way, then drop the "least important" variables while still retaining the most valuable parts of all of the variables. The core of PCA is built on the concept of Eigenvectors and Eigenvalues. PCA generally includes a measure of how each variable is associated with one another (Covariance matrix); the directions in which the data is dispersed are Eigenvectors; and the relative importance of these different directions are Eigenvalues. Auto-encoder learns a representation for a set of data. Auto-encoders are neural networks that aim to copy their inputs to their outputs into a latent space representation.

Pattern Similarity to Correct Misclassifications

Figure 6:
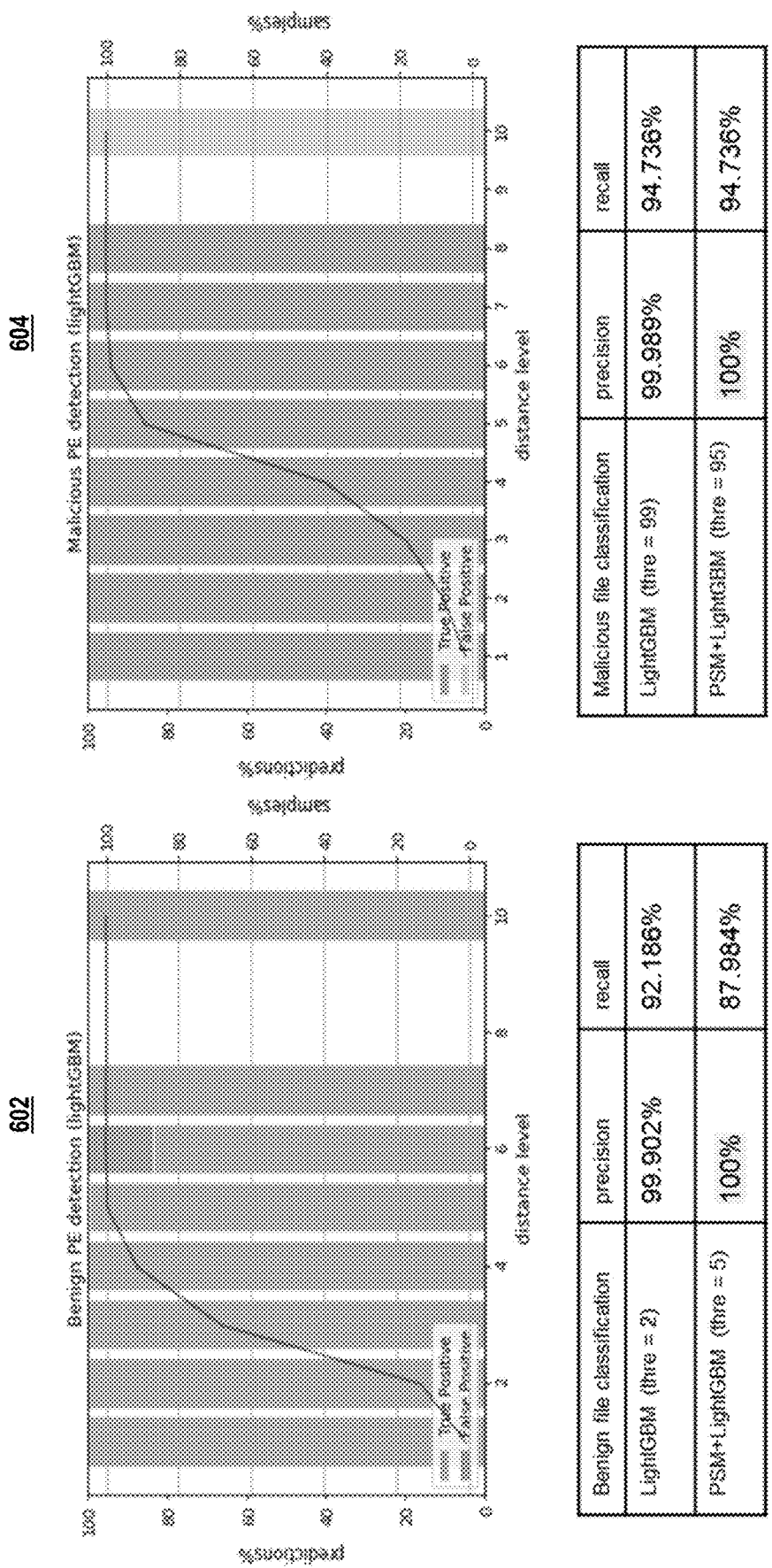
FIG. 6 is graphs of benign and malicious content classification of a Portable Executable (PE) file, to illustrate precision improvement using the pattern similarity.

FIG. 6 is graphs 602, 604 of benign and malicious content classification of a Portable Executable (PE) file, to illustrate precision improvement using the pattern similarity. The graph 602, 604 utilize LightGBM for classification of content (e.g., a PE file) as malicious or benign. LightGBM is a gradient boosting framework that uses tree-based learning algorithms. In the graphs 602, 604 and tables below, it is seen that LightGBM alone has a 99.902% and 99.898% precision rate for benign or malicious classification, respectively. With LightGBM plus the Pattern Similarity Measurement (PSM), it is seen the precision is raised to 100%.

Figure 7:
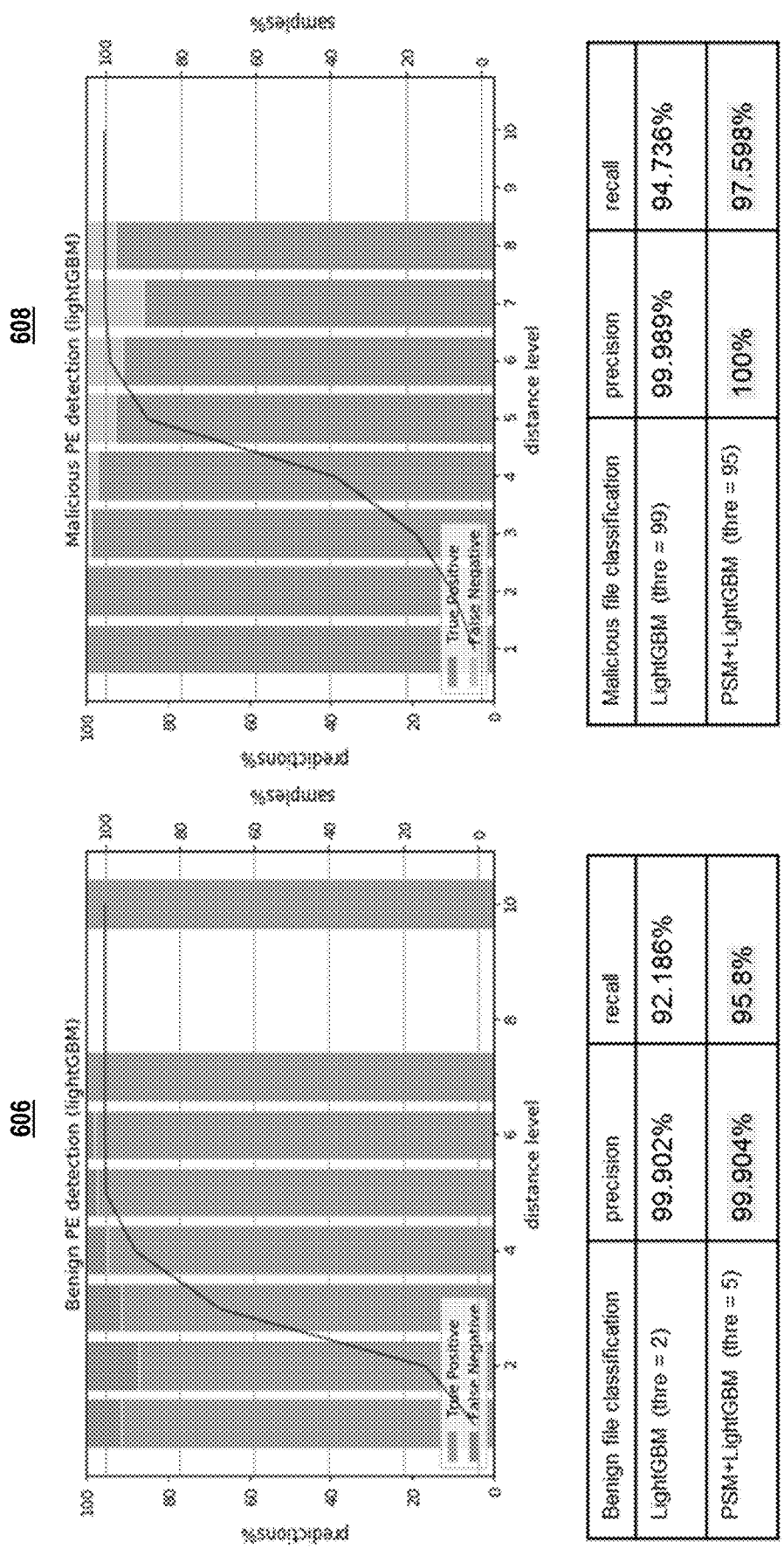
FIG. 7 is graphs of benign and malicious content classification of a PE file, to illustrate recall improvement using the pattern similarity.

FIG. 7 is graphs 606, 608 of benign and malicious content classification of a Portable Executable (PE) file, to illustrate recall improvement using the pattern similarity. FIG. 7 illustrates a use case where precision is kept relatively the same while recall is improved using LightGBM plus the PSM.

Pattern Similarity to Detect Drift

Figure 8:
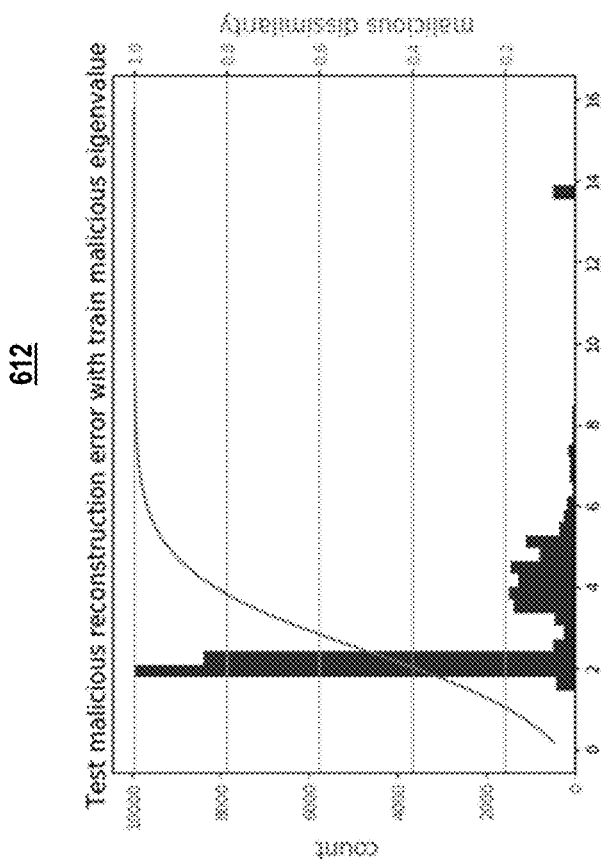
FIG. 8 is graphs of reconstruction errors over time to illustrate drift where the model requires retraining.
Figure 8:
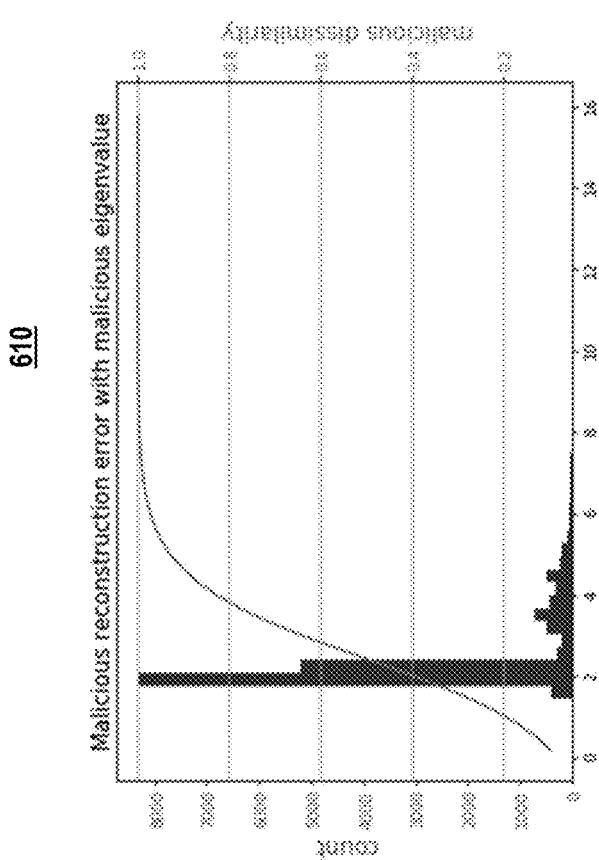

FIG. 8 is graphs 610, 612 of reconstruction errors over time to illustrate drift where the model requires retraining. The graph 610 is at one point in time where it is seen the training data pattern closely aligns to uncategorized content patterns. The graph 612 illustrates another point in time where the training data pattern has expanded or drifted so that there is less alignment. This can be used to determine there is a need to retrain the model.

Model Agnostic Examples

Figure 9:
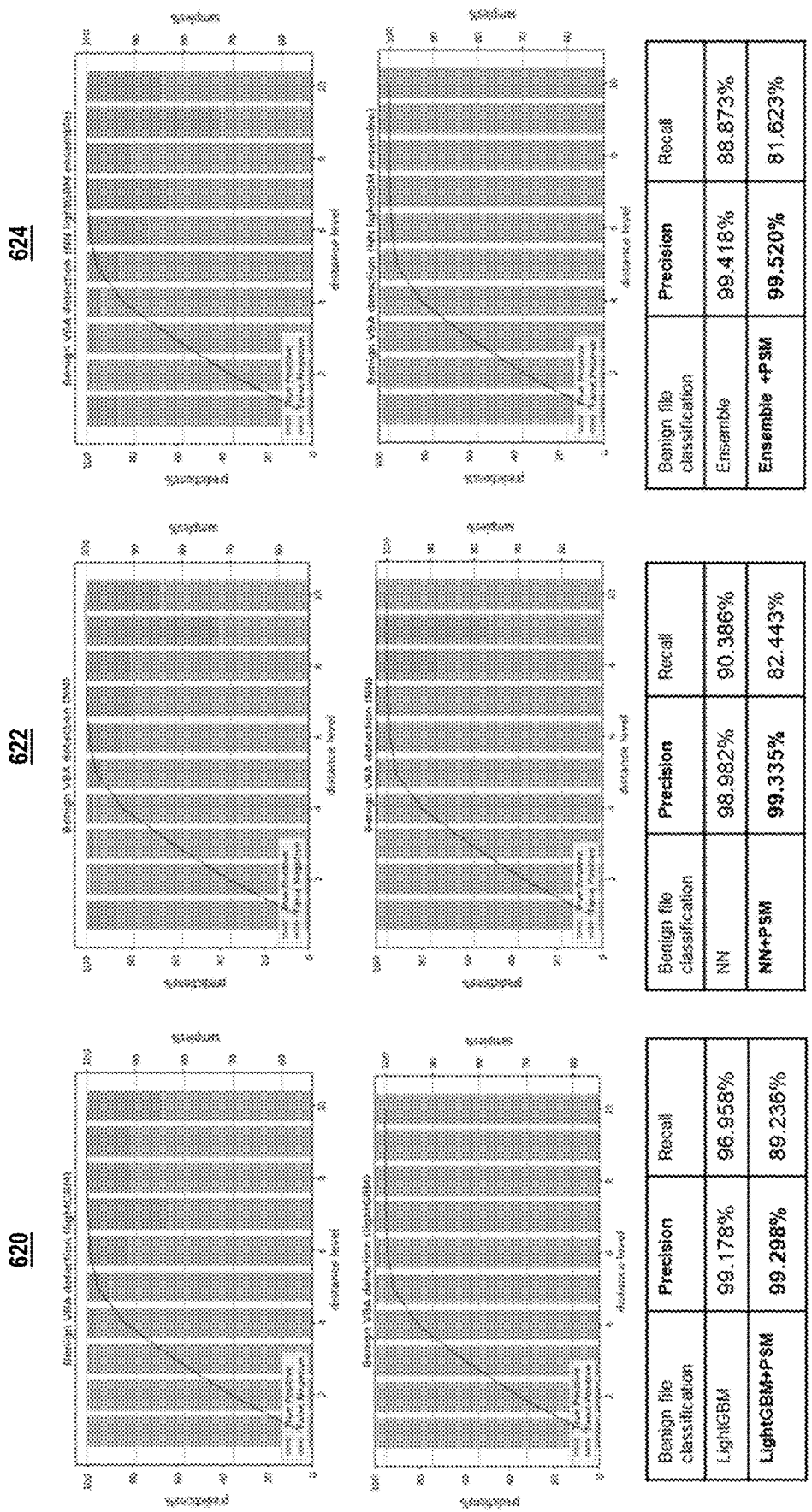
FIG. 9 is graphs of benign classification of Visual Basic for Applications (VBA) content with different models, with and without the Pattern Similarity Measurement (PSM)
Figure 10:
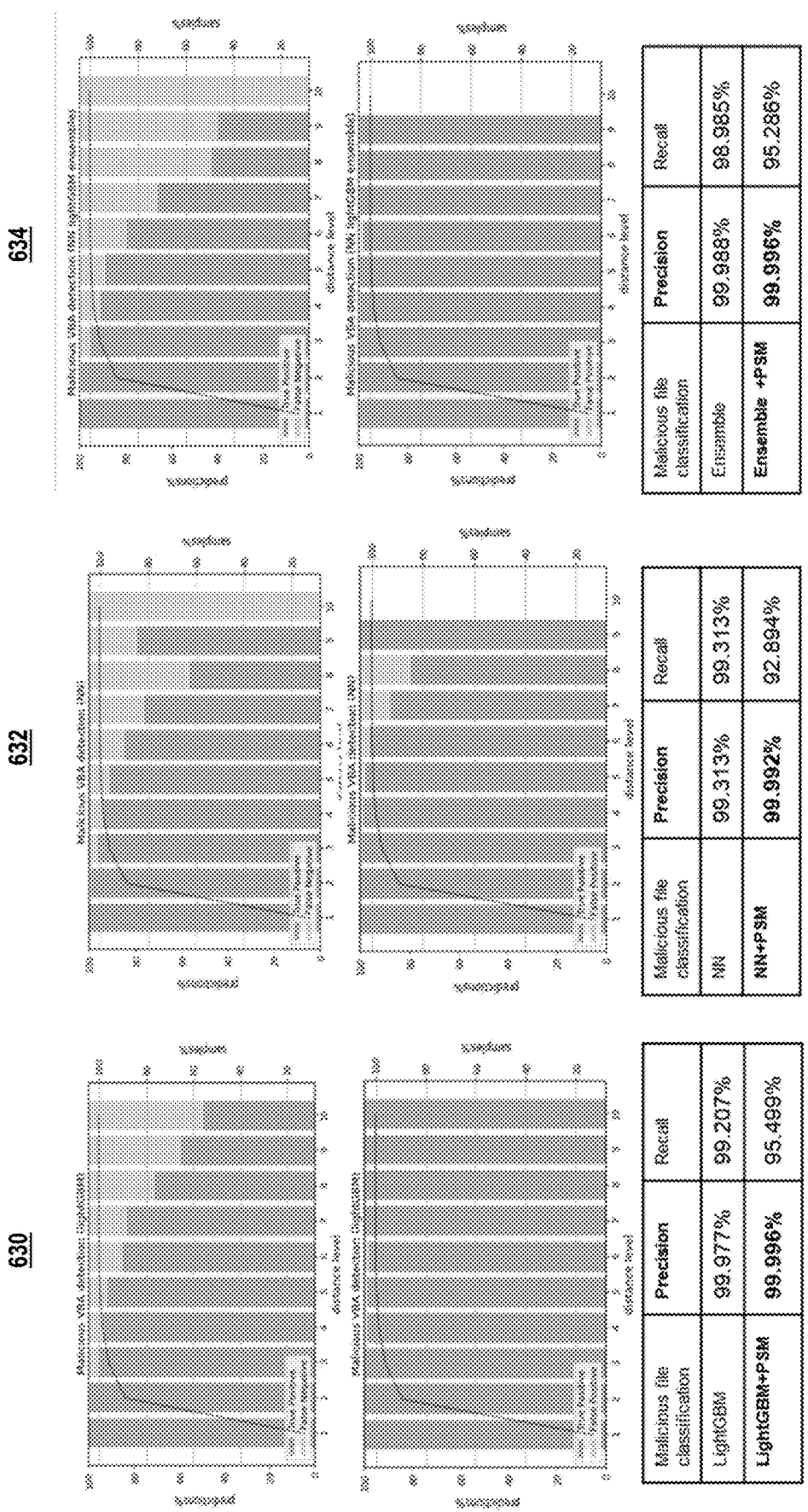
FIG. 10 is graphs of malicious classification of VBA content with different models, with and without the PSM.
Figure 11:
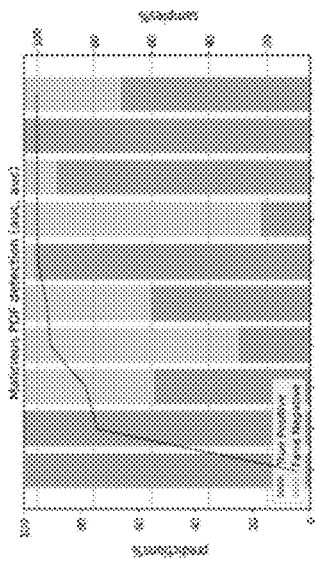
FIG. 11 is graphs of malicious classification of PDF content with different models, with and without the PSM.
Figure 11:
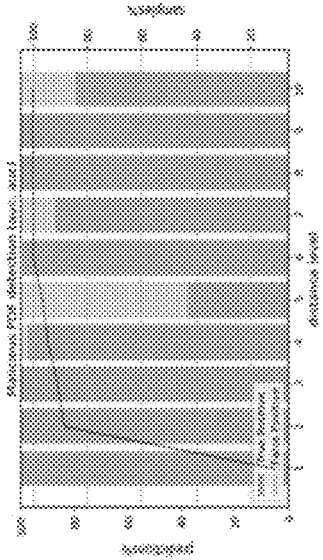
Figure 11:
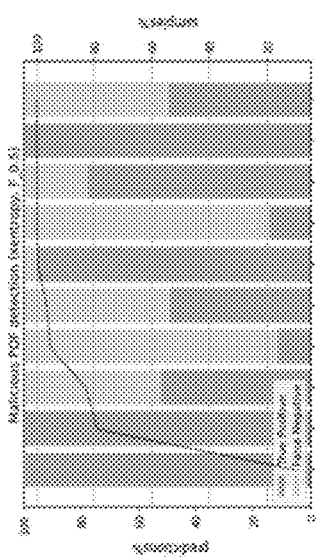
Figure 11:
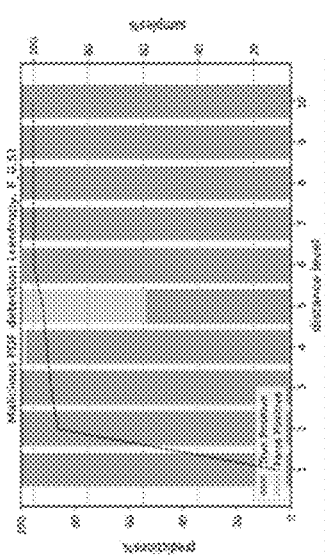
Figure 11:
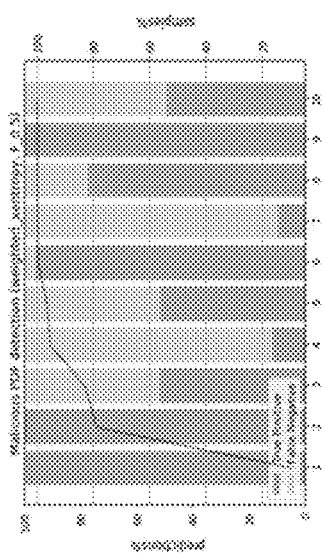
Figure 11:
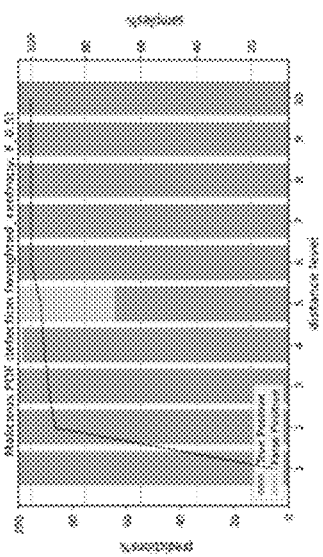

FIG. 9 is graphs 620, 622, 624 of benign classification of Visual Basic for Applications (VBA) content with different models, with and without the Pattern Similarity Measurement (PSM). The graphs 620 utilize LigthGBM, the graphs 622 utilize a Neural Network (NN), and the graphs 624 utilize an ensemble model of LightGBM and NN. The top graphs are the model only and the bottom graphs are the model plus PSM. As is seen in FIG. 9, the PSM add on works on any type of model including ensemble models. FIG. 10 is graphs 630, 632, 634 of malicious classification of VBA content with different models, with and without the PSM. The graphs 630, 632, 634 illustrate similar aspects as the graphs 620, 622, 624. FIG. 11 is graphs 640, 642, 644 of malicious classification of PDF content with different models, with and without the PSM. The models include AUC (Area under ROC Curves), Cross-entropy (Xentropy), weighted Xentropy, and LightGBM.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:
   receiving content for classification;
   prior to transforming features of the received content, performing an initial classification of the content, wherein the initial classification categorizes the content as one of benign and malicious utilizing a model that has been trained with a training set of data including benign data and malicious data;
   selecting and transforming features of the received content;
   determining a first pattern associated with the received content based on the transformed features, the content being one of an executable file, an office document, and a Portable Document File (PDF);
   comparing the first pattern with a second pattern, wherein the second pattern is associated with one of the benign data or the malicious data from the training set of data based on the initial classification;
   determining an uncertainty of the initial classification based on a distance between the first pattern and the second pattern; and
   blocking or allowing the content based on the initial classification and the distance being above or below a threshold, wherein the content is blocked if the content is initially categorized as malicious and the distance between the first pattern and a second pattern associated with malicious data from the training set of data is less than a first threshold, and wherein the content is allowed if the content is initially categorized as benign and the distance between the first pattern and a second pattern associated with benign data from the training set of data is less than a second threshold.

2. The non-transitory computer-readable storage medium of claim 1, wherein the computer-readable code is further configured to program the one or more processors to perform steps of
   discarding the classification if the distance is greater than a configurable threshold.

3. The non-transitory computer-readable storage medium of claim 1, wherein the computer-readable code is further configured to program the one or more processors to perform steps of
   determining the model has drifted based on the distance and one or more previous distances from previously classified content; and
   causing retraining of the model with a new training set of data, including new benign data and malicious data.

4. The non-transitory computer-readable storage medium of claim 1, wherein the distance represents a similarity between the received content and one of the benign data and the malicious data used to train model.

5. The non-transitory computer-readable storage medium of claim 1, wherein the first pattern and the second pattern are determined utilizing one of Principal Component Analysis (PCA) and Auto-encoder.

6. The non-transitory computer-readable storage medium of claim 1, wherein the first pattern and the second pattern are determined based on a plurality of features including raw byte ngram count and frequency, word frequency, entropy, and file size.

7. The non-transitory computer-readable storage medium of claim 1, wherein the distance is determined as a reconstruction error mapping a pattern to its original feature space.

8. A system comprising:
   a network interface;
   a processor communicatively coupled to the network interface; and
   memory storing computer-executable instructions that, when executed, cause the processor to
   receive content for classification, prior to transforming features of the received content, perform an initial classification of the content, wherein the initial classification categorizes the content as one of benign and malicious utilizing a model that has been trained with a training set of data including benign data and malicious data;

select and transform features of the received content;

determine a first pattern associated with the received content based on the transformed features, the content being one of an executable file, an office document, and a Portable Document File (PDF);

compare the first pattern with a second pattern, wherein the second pattern is associated with one of the benign data or the malicious data from the training set of data based on the initial classification;

determine an uncertainty of the initial classification based on a distance between the first pattern and the second pattern; and block or allow the content based on the initial classification and the distance being above or below a threshold, wherein the content is blocked if the content is initially categorized as malicious and the distance between the first pattern and a second pattern associated with malicious data from the training set of data is less than a first threshold, and wherein the content is allowed if the content is initially categorized as benign and the distance between the first pattern and a second pattern associated with benign data from the training set of data is less than a second threshold.

9. The system of claim 8, wherein the computer-executable instructions, when executed, further cause the processor to discard the classification if the distance is greater than a configurable threshold.

10. The system of claim 8, wherein the computer-executable instructions, when executed, further cause the processor to determine the model has drifted based on the distance and one or more previous distances from previously classified content; and cause retraining of the model with a new training set of data, including new benign data and malicious data.

11. The system of claim 8, wherein the distance represents a similarity between the received content and one of the benign data and the malicious data used to train model.

12. The system of claim 8, wherein the first pattern and the second pattern are determined utilizing one of Principal Component Analysis (PCA) and Auto-encoder.

13. The system of claim 8, wherein the first pattern and the second pattern are determined based on a plurality of features including raw byte ngram count and frequency, word frequency, entropy, and file size.

14. A method comprising:

receiving content for classification;

prior to transforming features of the received content, performing an initial classification of the content, wherein the initial classification categorizes the content as one of benign and malicious utilizing a model that has been trained with a training set of data including benign data and malicious data;

selecting and transforming features of the received content;

determining a first pattern associated with the received content based on the transformed features, the content being one of an executable file, an office document, and a Portable Document File (PDF);

comparing the first pattern with a second pattern, wherein the second pattern is associated with one of the benign data or the malicious data from the training set of data based on the initial classification;

determining an uncertainty of the initial classification based on a distance between the first pattern and the second pattern; and blocking or allowing the content based on the initial classification and the distance being above or below a threshold, wherein the content is blocked if the content is initially categorized as malicious and the distance between the first pattern and a second pattern associated with malicious data from the training set of data is less than a first threshold, and wherein the content is allowed if the content is initially categorized as benign and the distance between the first pattern and a second pattern associated with benign data from the training set of data is less than a second threshold.

15. The method of claim 14, further comprising discarding the classification if the distance is greater than a configurable threshold.

16. The method of claim 14, further comprising determining the model has drifted based on the distance and one or more previous distances from previously classified content; and causing retraining of the model with a new training set of data including new benign data and malicious data.

* * * * *